United States Patent [19]

Nishiyama et al.

[11] Patent Number: 4,763,882

[45] Date of Patent: Aug. 16, 1988

[54] COATED COIL SPRING

[75] Inventors: Masakazu Nishiyama; Chiharu Umetsu, both of Yokohama; Akira Kebukawa, Kawasaki; Mituru Andoh, Yokohama, all of Japan

[73] Assignee: NHK Spring Co., Ltd., Yokohama, Japan

[21] Appl. No.: 933,293

[22] Filed: Nov. 20, 1986

Related U.S. Application Data

[63] Continuation-in-part of Ser. No. 733,530, May 13, 1985, abandoned.

[30] Foreign Application Priority Data

May 21, 1984 [JP] Japan ................... 59-102048

[51] Int. Cl.[4] ................... F16F 1/10; B60G 11/52
[52] U.S. Cl. ................... 267/33; 267/152; 267/166; 267/195; 267/214; 280/701
[58] Field of Search ................. 267/33, 152, 8 R, 151, 267/166, 167, 174, 286, 287, 195, 200, 201, 202, 203, 204, 209, 214; 280/701, 721, 724; 248/565

[56] References Cited

U.S. PATENT DOCUMENTS

| 2,103,946 | 12/1937 | Herr | 267/33 |
| 2,230,069 | 1/1941 | Rushmore | 267/33 |
| 3,096,084 | 7/1963 | Osterhoudt | 267/33 |
| 3,606,295 | 9/1971 | Appleton | 267/63 R |
| 4,264,743 | 4/1981 | Maruyama et al. | 521/101 |
| 4,477,061 | 10/1984 | Kawaura et al. | 267/33 |

FOREIGN PATENT DOCUMENTS

| 1660341 | 4/1971 | Fed. Rep. of Germany . |
| 7807245 | 6/1978 | Fed. Rep. of Germany . |
| 5712074 | 7/1981 | Japan . |
| 690340 | 5/1953 | United Kingdom . |

Primary Examiner—George E. A. Halvosa
Assistant Examiner—Matthew C. Graham
Attorney, Agent, or Firm—Frishauf, Holtz, Goodman & Woodward

[57] ABSTRACT

A coated coil spring wrapped in a coating member prepared from a soft synthetic resin foam, wherein the coating members of the respective coil spring turns constituting at least the effective region of the coil spring are provided with a helical clearance; and the width of said clearance accounts for 0.15 to 0.50 times the width of the adjacent coil spring turns.

6 Claims, 3 Drawing Sheets

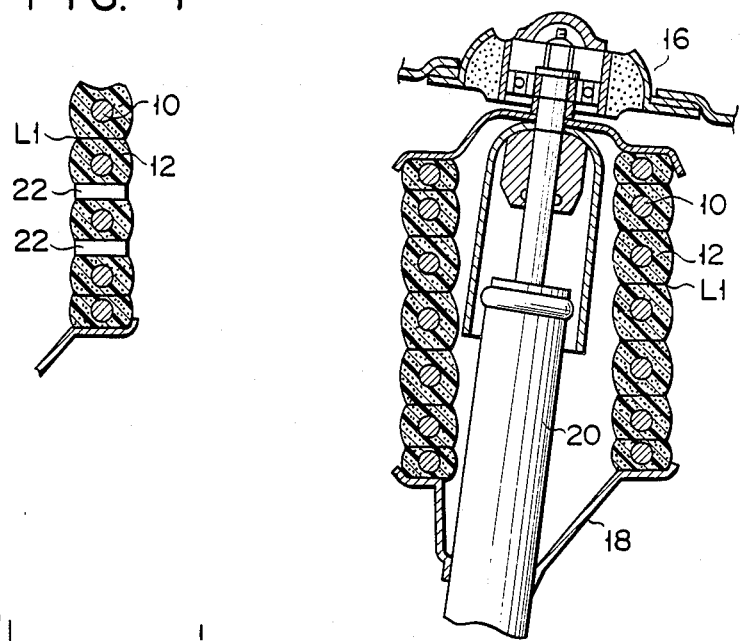
FIG. 4
FIG. 3
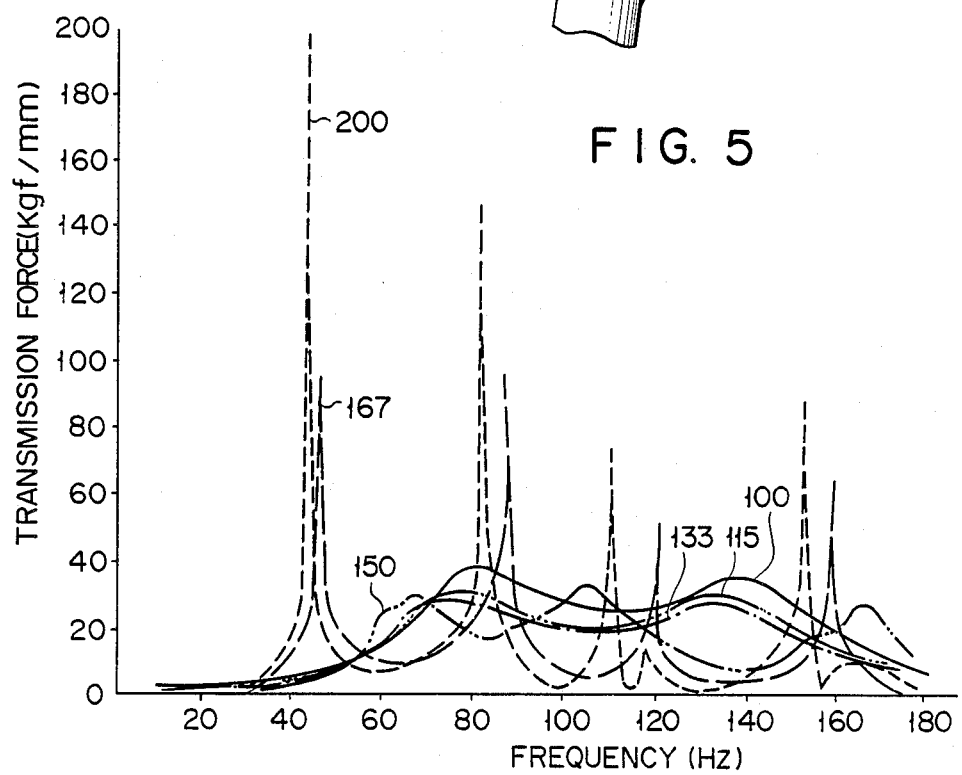
FIG. 5

COATED COIL SPRING

This application is a continuation-in-part of application Ser. No. 733,530, filed May 13, 1985 now abandoned.

BACKGROUND OF THE INVENTION

This invention relates to a coated coil spring having a coil spring wrapped in a coating member of soft synthetic resin foam to form a plurality of coated coil spring turns, wherein a helical clearance is formed between adjacent turns of said coated coil spring.

The coated coil spring offers the advantages of preventing noises arising from the collision between the coil turns, protecting said turns from damage, and suppressing the resonant vibration of the coated coil spring during application and consequently is accepted as, for example, the bedding of rolling stock.

The conventional coated coil spring is constructed by helically winding a wire completely wrapped in a substantially cylindrical rubber or synthetic resin foam with no helical clearance allowed between the respective turns. The coated coil spring proposed to date indeed has a very effective function, but is still found to leave much room for improvement. Namely, the conventional coated coil spring has the drawbacks that since not only the peripheral walls of the coil turns but also their interstices are wrapped in the coating material, the dynamic spring constant noticeably increases, thereby reducing the function of a coated coil spring in use; and therefore when the coated coil spring is used with a vehicle suspension device, the riding comfort is undesirably decreased.

To avoid the above-mentioned difficulties, the Japanese patent disclosure No. 57-120746 was published which set forth a coated coil spring whose turns were wrapped in a coating material with a slight helical clearance allowed between the respective coated turns.

However said patent disclosure No. 57-120746 has the drawbacks that when the helical clearance was unduly small and the coated coil spring was used in a vehicle suspension system, the dynamic spring constant became so large that riding comfort was reduced; and when the clearance was very large and the dynamic spring constant was decreased, surging of the coated coil spring and consequently a violent banging noise occurred.

SUMMARY OF THE INVENTION

It is accordingly the object of this invention to provide a coated coil spring having a plurality of turns which are wrapped in a proper coating material that prevents an increase in the dynamic spring constant, and suppresses the surging thereof.

To attain the above-mentioned object, this invention provides a coated coil spring characterized in that the respective turns are wrapped in soft synthetic resin with a helical clearance allowed between the respective turns throughout the effective coil region; when said coated coil spring undergoes no load, that is, remains in a free state, the clearance between the respective coating materials enclosing the individual coil turns accounts for 0.15 to 0.5 of the distance between the respective helically wound wires. The coated coil spring of this invention having a helical clearance of the above described width has a dynamic spring constant smaller than that of a coated coil spring having no, or a narrower helical clearance. Furthermore due to the shifting of resonance frequencies by selecting the width of the helical clearance, surging is prevented, and when used with the vehicle-suspending device, the coated coil spring of the invention ensures the effect of improving the riding comfort and reducing the noises which might otherwise become noticeable.

BRIEF DESCRIPTION OF THE DRAWINGS

FIG. 3 is a schematic sectional view of the coated coil spring of FIG. 1 when fitted to the vehicle-suspending system;

FIG. 4 shows air ducts provided in the coating materials of the coated coil spring of FIG. 2;

FIG. 5 indicates experimental data (kgf/mm) of various coated coil springs each having a transfer characteristic i.e., a transmitted force per unit amplitude of an exciting force.

DETAILED DESCRIPTION OF THE PREFERRED EMBODIMENTS

Figure 1:
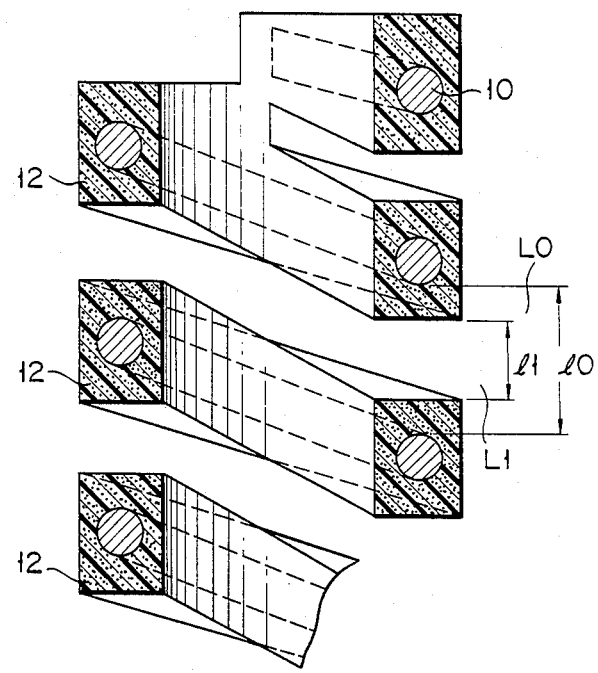
FIG. 1 is a partial sectional view of a coated coil spring according to a first embodiment of this invention in a nonloaded state.

FIG. 1 is a longitudinal sectional view along the axis of an unloaded coated coil spring according to a first embodiment of this invention. Reference numeral 10 represents a coil spring constructed by helically winding a coil wire made of, for example steel (the axial distance between the respective coil wire turns is represented by $l_0$; and the axial distance between the coatings of the respective coil wire turns is denoted by $l_1$). The coil wire is wrapped in a coating member 12 prepared from soft synthetic resin foam, for example, polyurethane foam. The coating member 12 is fabricated by holding the coil spring 10 in a mold and later expanding the foaming material filled in the interstice between the outer wall of the respective coil wire turns and the inner wall of the mold. At least in the effective region of the coil spring 10, the distance $l_1$ between the coatings of the respective coil wire turns accounts for 0.15 to 0.50 of the distance $l_0$ between the respective coil wire turns, thereby producing a helical clearance $L_1$.

Figure 2:
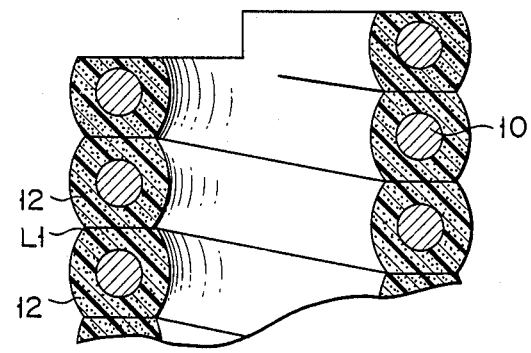
FIG. 2 illustrates the coated coil spring of FIG. 1 which is subjected to a load, thereby causing the coating materials of the respective coil turns to be contacted by each other.

FIG. 2 illustrates the compressed coated coil spring turns obtained when a weight is applied on the coated coil spring of FIG. 1 in the axial direction, until the distance $l_1$ between the coatings of the respective coil turns is reduced to zero. The pattern of FIG. 2 represents, for example, the condition observed when the coated coil spring applied to the vehicle-suspension system undergoes a prescribed load. As used herein, the prescribed load is defined to mean the load imposed on the coated coil spring when the vehicle carries no passengers (including the railroad crew) or cargo, or when the vehicle carries an allowable number of passengers (including the railroad crew) or a permissible quantity of cargo. When vehicle vibrations are discussed, the above-defined load is suitably selected according to the intended object. Since however, the determination of said load falls outside of the object of this invention, the load is simply referred to as "a reference load", including all possible applications.

Referring to FIG. 1, the coating member 12 has a square cross section. This shape is given simply as an example. Where necessary, however, it is possible to cause that side of the coating member 12 which is positioned on the inside or outside or both sides of the coated coil spring to be curved or allow the coating member 12 to have any other cross-sectional shape.

FIG. 3 illustrates the coated coil spring of this invention assembled with a vehicle suspending device. In this case, the coated coil spring is fitted to a member 16 of the vehicle body and a member 18 used to support the wheel shaft. Reference numeral 20 denotes a shock absorber. When the coated coil spring 10 is rapidly compressed or expanded, air remaining inside the coated coil spring 10 is pushed outward or air surrounding the coated coil spring 10 is drawn inward. Since, in such case, noises arise due to the outflow and inflow of air streams, it is advised to provide an air duct in the aforementioned vehicle body member 16 or the member 18 thereby to suppress the occurrence of noises. Or it is possible, as illustrated in FIG. 4, to provide one or more air ducts 22 in some sections of the coating member 12, thereby causing the inside and outside of the coated coil spring 10 to communicate with each other. When the coated coil spring 10 of this invention is applied to general machinery other than the vehicle-suspending system, it is also preferred to provide the above-mentioned air ducts.

For experiments, coil springs of the same design having the characteristics shown in Table 1 below were wrapped in coating materials listed in Table 2 below to provide coated coil springs 10.

TABLE 1

| Loaded Condition | Load (kgf) | Height (mm) |
| --- | --- | --- |
| E | 545 | 102.0 |
| D | 484 | 138.0 |
| C | 375 | 202.0 |
| B | 320 ± 12 | 234.5 |
| A | 0 | 422.5 |

Where:
spring constant k:         1.70 ± 0.12 kgf/mm
wire diameter:             13.2 mm
coil spring diameter D:    152.2 mm
effective turn number Ne:  5.07
total turn number N:       6.75

TABLE 2

| Name | % by weight A | B | C | Remarks |
| --- | --- | --- | --- | --- |
| Polyol of polyether series ① | 53.72 | 50-65 | 53-60 | |
| Isocyanate ② | 25.66 | Note 1 | Note 2 | |
| Polyol of polyether series ③ | 9.48 | 0-15 | 9.0-10 | Uses as a reaction-controlling agent |
| Petroleum base resin (Filler) ④ | 6.32 | 3-10 | 6.0-6.5 | Water-repellency decreased |
| Water ⑤ | 2.02 | 1.7-2.2 | 2.0-2.1 | |
| Coloring material (black) | 1.90 | | | |
| Reactive silicone | 0.63 | | | Water proofness is obtained |
| Catalyst of amine series | 0.13 | Note 3 | | |
| Catalyst of tin series | 0.08 | | | |
| Catalyst of silicone series | 0.06 | | | |
| Density | 0.04 g/cm$^3$ | 0.035-0.06 g/cm$^3$. | | |

Note 1:
The polyol of polyester series consists of adipic acid and diethylene glycol having a functionality of 3, an OH value of 56, a molecular weight of 2000, and is available from Nippon Polyurethane as Desmophen 2200. The quantities (% by weight) of the components $^{1, 3}$ and $^5$ of the coating material to be mixed together are respectively divided by the corresponding equivalents. The total of the quotients thus obtained is multiplied by the equivalent of the isocyanate $^4$. The product is divided by a value ranging between 1.0 and 1.05. The quotient (% by weight) thus obtained is indicated in the section of Note 1 of Table 2 above.

Note 2:
Isocyanate is preferably tolylene diisocyanate with an 80/20 mixture of 2,4-isomer and 2,6-isomer, and is available from Mitsui Toatsu Chemicals, Ltd. as T-80. The quantity (% by weight) in this section is obtained in the same manner as Note 1 except for the change in value from 1.0 to 1.05 to a value from 1.02 to 1.03.

Note 3:
The polyol of polyether series is a combination of glycerine and propylene oxide having a functionality of 3, an OH value of 56, a molecular weight of 3000, and is available from Asahi Glass Co., Ltd. as EX-3030. The coloring material (black), reactive silicon, catalyst of the amine series, catalyst of the tin series and catalyst of the silicon series are respectively added in such amounts as are properly allotted from the balance arrived at by subtracting the total quantities of the above-mentioned materials $^{1, 2, 3, 4}$ and 5 from 100% by weight.

The numerals given in the two columns in the Table 1 indicate the characteristics of the coil spring without coating material (the relationship between the load and height). Row A denotes the unloaded condition of the coil spring; row B shows the condition of the coil spring assembled with the vehicle; row C sets forth the load of the coil spring when its height was mainly specified by the customer during its manufacture; row D indicates the condition of the coil spring when subjected to an allowable maximum load; row E represents the magnitude of the load which was applied until the respective turns of the coil spring were tightly pressed together.

Figure 6:
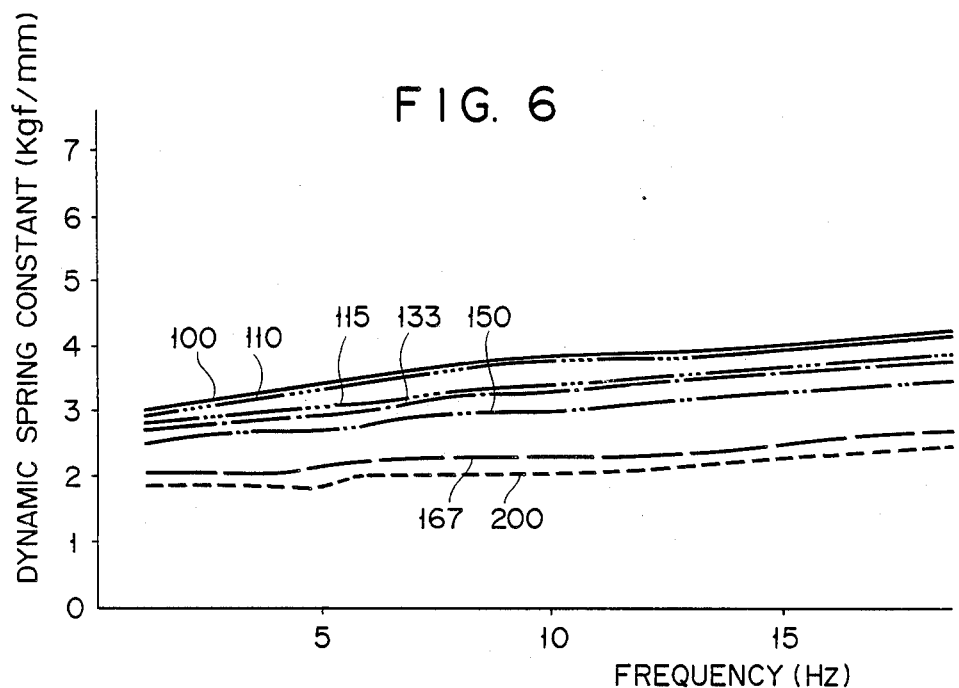
FIG. 6 shows experimental data on the dynamic spring constant of the various coated coil springs embodying this invention.

Column A of Table 2 shows the blending proportions (% by weight) of the respective components of foamed masses used in the experiments of FIGS. 5 and 6. Column B of Table 2 indicates the range of the blending proportions which were experimentally proved to give satisfactory results. Column C of Table 2 sets forth the blending proportions which caused the coated coil spring embodying this invention to be judged as most excellent.

The curves of FIG. 5 represent the determined load transfer characteristics of six samples of coated and uncoated coil springs set forth in Table 1, namely, the case where the respective coated coil turns leave no clearance $L_1$ (that is $l_1/l_0=0$), the cases where $l_i/l_0$ indicates 0.15, 0.33, 0.50 and 0.67 and the case where the coil spring is not wrapped in any coating material (that is, $l_1/l_0=1$). Curves 100, 115, 133, 150, 167 and 200 shown in FIG. 5 respectively denote the $l_i/l_0$ ratio values of 0, 0.15, 0.33, 0.50, 0.67, and 1.00. The curves of FIG. 6 show seven $l_1/l_0$ ratio values including the above-mentioned $l_1/l_0$ ratio values and also the $l_i/l_0$ ratio value of 0.10. Curve 110 of FIG. 6 represents the measured $l_i/l_0$ ratio value of 0.10.

FIGS. 5 and 6 set forth data on the values of the $l_i/l_0$ ratios. Since the measured data include an uncoated coil spring, all coil springs of FIGS. 5 and 6 are referred to as "tested coil springs". The coil springs under test were subjected to an exciting force having a prescribed amplitude but different frequencies. The force transmitted by the exciting force is measured and the measured value was divided to obtain a quotient by the above-mentioned prescribed amplitude. The experimental curves of FIG. 5 represent a series of quotients. FIG. 6 shows changes in the dynamic coil spring constant corresponding to the different frequencies of the exciting force, which were figured ou from the results of experiments conducted in the same manner as in FIG. 5.

As used herein, the dynamic spring constant is defined as follows. Now let it be assumed that the coated coil spring of this invention is subjected to an exciting force whose magnitude varies with frequency; the relationship between the amplitude of said exciting force and the deflection of the coil spring is plotted on the rectangular co-ordinate system to provide a hysteresis loop. Then the above-mentioned dynamic spring constant is defined to represent a ratio between the extent of the exciting force and the extent of the coil spring deflection.

The present inventors have determined from the experimental curves shown in FIGS. 5 and 6 and many other experimental data that the ratio of $l_1/l_0$ should preferably have a value larger than 0.15 and smaller than 0.50; and that the most preferable $l_1/l_0$ ratio substantially stands at 0.33. The $l_1/l_0$ ratio having a value larger than 0.15 and smaller than 0.50, as set forth in the claim of the present patent application, has been defined from the aforementioned data.

Description may now be made with reference to the experimental curves of FIGS. 5 and 6 of the reason why the value of the $l_i/l_0$ ratio has been defined to fall within the above-mentioned range. It can be seen from the curves of FIG. 5 that each of the curves 167 and 200 having the $l_1/l_0$ ratios larger than 0.5 indicates substantially equidistantly spaced four sharp peaks. It is further seen from FIG. 5 that as the ratio $l_1/l_0$ has a larger value, these sharp peaks are shifted nearer to the low frequency region and the sharp peaks are raised to a higher level. The above-mentioned excessive rise in the peak levels is objectionable to the mechanical strength of the vehicle and vehicle-suspending coil spring. The same experimental results as mentioned above were obtained with respect to the coated coil springs falling outside of the range of the coil springs shown in Table 1. It was further confirmed that in the region where the ratio of $l_1/l_0$ had a smaller value than 0.50, the resonance frequency of a coated coil spring changed, thereby suppressing the occurrence of the aforementioned difficulties. The above-mentioned fact is the reason why the allowable upper limit to the value of the ratio $l_1/l_0$ is set at 0.5.

Description may now be made of the experimental curves representing the values of seven $l_1/l_0$ ratios of FIG. 6. As the value of the $l_1/l_0$ ratio increases from 0, the curves progressively fall downward. The lowest curve denotes an uncoated coil spring ($l_1/l_0=1$). What should be noticed in this case is that the curves 115, 133, 150 occupying the intermediate positions among the seven curves are set closely adjacent to each other, whereas the curves 110 and 100, drawn near to each other, are separated from the above-mentioned three intermediate curves 115, 133, 150 at a noticeable distance. The above-mentioned tendencies shown in FIG. 6 were also observed in the experiments with different coated coil springs from those of FIG. 1. This fact means that where the value of the ratio $l_1/l_0$ of a coated coil spring assembled with the vehicle-suspension system dropped from 0.5 to a level approaching 0.10, then the dynamic coil spring constant suddenly rose, thereby reducing the riding comfort and steering characteristic of the vehicle. The above-mentioned facts are the reasons why in the present invention, the allowable lowermost limit to the value of the ratio $l_1/l_0$ is set at 0.15.

The coated coil springs wrapped in the coated material whose components are listed in the afore-mentioned Table 2 offer the advantages that said coated coil springs are characterized by high water proofness and low attenuation in vibration; the coating material 2 is prepared from the material which is flexible and minimizes hysteresis loss; and the provision of the coating material 2 minimizes a rise in the dynamic spring constant.

Figure 7:
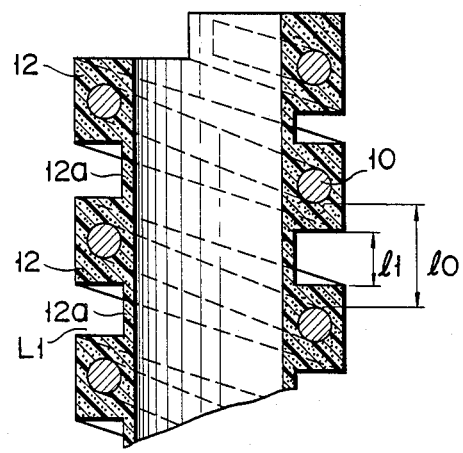
FIG. 7 is a schematic sectional view of a coated coil spring according to a second embodiment of the invention.

FIG. 7 shows a coated coil spring according to another embodiment of this invention. In this second embodiment, a thin film 12a is stretched on the inside of the coil spring to connect the adjacent coated coil spring turns. Thus it is possible to prevent dust and muddy water from setting on, for example, a shock absorber 20 (FIG. 3) placed in the coated coiled spring. In this connection, it is preferred that said thin film 12a be allowed to have a smaller thickness than about 5 mm (in the case of a coated coil spring used in a vehicle-suspension system) in order to prevent the force transfer characteristic of the coil and the dynamic spring constant from being adversely affected.

In other respects, the second embodiment of FIG. 7 offers the same advantages as the first embodiment, namely, that an increase in the dynamic spring constant and the occurrence of vertical vibrations can be prevented.

Figure 8:
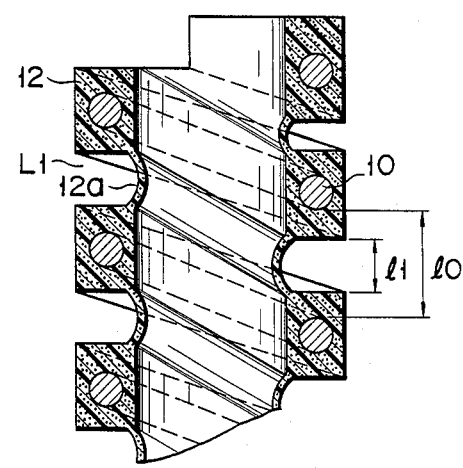
FIG. 8 is a schematic sectional view of a coated coil spring according to a third embodiment of the invention.

A third embodiment of FIG. 8 is characterized in that the aforementioned thin film 12a is curved toward the interior of the coil spring. The provision of said curved portion offers the advantage that when the coil spring is stretched by rebound, said thin film 12a is prevented from being subjected to excessive tension stresses. Throughout the aforementioned three embodiments, it is possible to provide air ducts 22 (FIG. 4) in some of the interstices of the respective coil spring turns.

As mentioned above, the coated coil spring of this invention offers the advantages that the helical clearance between the respective coated coil spring turns suppresses an increase in the dynamic spring constant and also the occurrence of surging of the coated coil spring; the coil spring and its surrounding members can be prevented from being jointly vibrated by changing the resonance frequencies of the coated coil spring and surrounding members; when the subject coated coil spring is assembled with, for example, a vehicle suspending device, it is possible to elevate the riding comfort of the vehicle due to a reduction in the dynamic spring constant; and surging and the resultant occurrence of noises can be effectively minimized.

What is claimed is:

1. A coated coil spring for use in a vehicle suspension, comprising a coil spring wrapped in a coating member of soft synthetic resin foam to form a plurality of coated coil spring turns of which the foam is effective to absorb energy applied to the spring by an exciting force and to suppress surging thereof, wherein a helical clearance is formed between adjacent turns of said coated coil spring turns located at least in an effective coil spring region, the width of said helical clearance is, when the coated coil spring is in an unloaded condition, defined as 0.15 to 0.50 times the distance between the respective coil spring turns, and adjacent turns of said coated coil spring being in contact with each other when the coated coil spring is operatively installed in said vehicle and is affected by the vehicle weight under a steady state condition;

whereby energy absorption by said foam due to spring compression occurs immediately upon a departure from said steady state condition.

2. The coated coil spring according to claim 1, wherein a thin film is provided in the interior of said coated coil spring to connect the adjacent coated coil spring turns.

3. The coated coil spring according to claim 2, wherein said thin film is curved toward the interior of the coated coil spring.

4. The coated coil spring according to claim 1, wherein an air duct is provided to establish communication between the inside and outside of the coating member of at least one of the respective coated coil spring turns.

5. The coated coil spring according to claim 1, wherein said coating material is prepared from polyurethane foam.

6. The coated coil spring of claim 1, wherein said soft synthetic resin foam comprises:
 (a) 50–65% polyol of polyester series by weight;
 (b) 0–15% polyol of polyether series by weight;
 (c) 3–10% petroleum base resin by weight, which serves as a filler;
 (d) 1.7–2.2% water by weight; and
 (e) isocyanate, the % by weight of which is determined by: multiplying the % by weight of (a), (b) and (d) by the corresponding equivalents, obtaining the total of the products, multiplying the total by the equivalent of the isocyanate, and dividing this product by a value ranging between 1.0 and 1.05.

* * * * *